Jan. 4, 1938.                T. W. MURPHY                2,104,390
                      LIQUID PRESSURE REGULATING VALVE
                          Filed Oct. 2, 1936           2 Sheets-Sheet 1
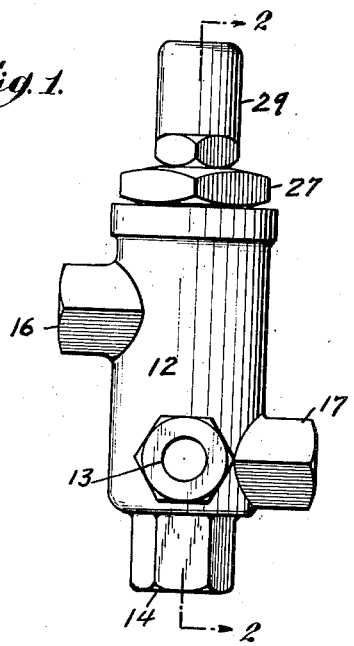
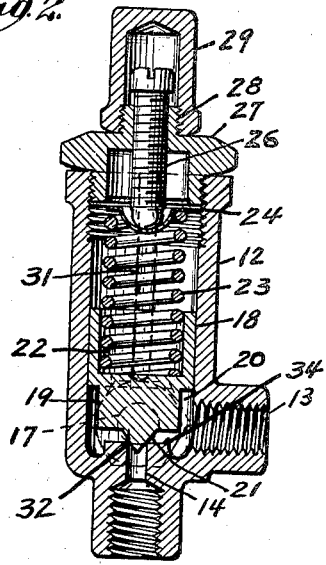
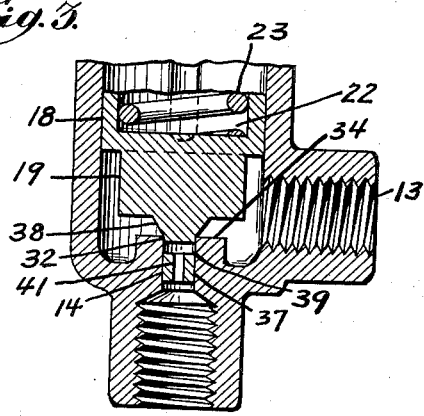
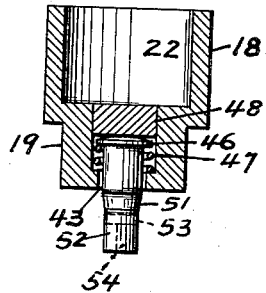
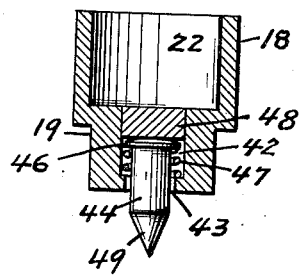
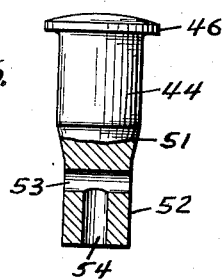
Inventor
Thomas W. Murphy
by
Attorney.

Jan. 4, 1938.　　　　　T. W. MURPHY　　　　　2,104,390
LIQUID PRESSURE REGULATING VALVE
Filed Oct. 2, 1936　　　　2 Sheets-Sheet 2
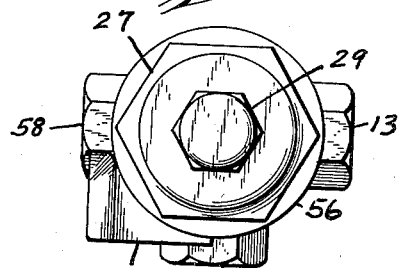
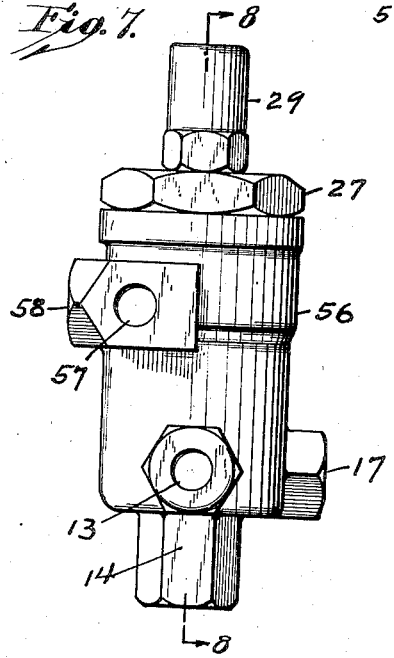
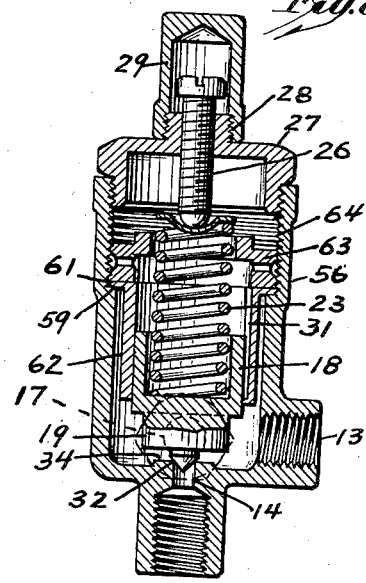
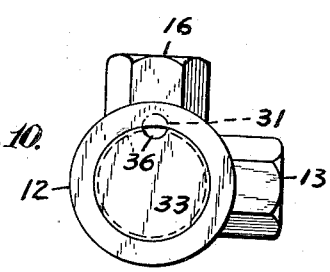
Inventor
Thomas W. Murphy
by T. B. A. Humphries.
Attorney.

Patented Jan. 4, 1938

2,104,390

UNITED STATES PATENT OFFICE 2,104,390

LIQUID PRESSURE REGULATING VALVE

Thomas W. Murphy, Bala-Cynwyd, Pa., assignor to Monarch Manufacturing Works, Inc., Philadelphia, Pa., a corporation of Delaware Application October 2, 1936, Serial No. 103,704

13 Claims. (Cl. 137—153)

This invention relates to a liquid fuel pressure regulating valve, and particularly to the mechanical structure thereof.

The object of the invention is to provide a valve of simple construction, definite in operation, and economical from the standpoint of cost in manufacture.

Another object of the invention is to provide a valve of the type aforesaid wherein the number of operating parts are reduced.

A further object of the invention is to eliminate noises and vibrations when the pump volume of fuel supplied to the valve is only sufficient to crack the by-pass seat.

A still further object of the invention is to provide in the valve casing two outlet ports on the by-pass seat of the piston, one for connection to the vacuum side of the pressure pump, which supplies liquid under pressure to said valve, and the other for connection to the source of supply.

A still further object of the invention is to provide a valve in which the piston operates in a removable sleeve, and which said sleeve forms an annular space with the inner wall of the valve casing.

This application is based partly on Figure 5 of applicant's Patent 2,036,489, granted April 7, 1936.

According to the invention, the valve casing is provided with a removable sleeve which is bored to provide for the operation of a piston therein, said piston having adjustable tension means for acting against fluid pressure, said casing having an inlet port, a burner port, and a by-pass port or ports, valve means carried by said piston and normally closing said burner port, and a channel in the wall of said sleeve, whose lower end extends above the bottom of the piston when in its normal position with the burner port closed. The piston may be provided with a valve stem resiliently mounted for effectually seating in the burner port to close the same. The valve may be provided with one by-pass port leading from the upper side of the piston for connection with the fuel supply, or it may be provided with an additional port for connection to the suction side of the pressure pump.

The drawings illustrate embodiments of the invention, and the views therein are as follows:—

Figure 1 is a side view of the valve in which the casing is bored for the operation of the piston, Figure 2 is a vertical sectional view taken on the line 2—2 of Figure 1, Figure 3 is an enlarged fragmentary view of the lower end of the valve casing and shows a modified form of valve stem, Figure 4 is an enlarged vertical sectional view of the piston showing a resiliently mounted valve stem with means for guiding the stem in the burner port, Figure 5 is a like view showing a valve stem resiliently mounted, and with its lower end formed as a needle, Figure 6 is an enlarged face view partly in section showing the type of valve stem employed in Figure 4, Figure 7 is a side elevation of a valve in which the piston operates in a removable sleeve, and wherein the casing is provided with a pair of by-pass ports at a point leading from the casing above the piston, Figure 8 is a vertical sectional view of the same on the line 8—8 of Figure 7, Figure 9 is a top plan view of the valve shown in Figure 7, Figure 10 is a top plan view of the casing showing the method employed in forming the channel in the valve casing of Figures 1, 2, and 3, or in the sleeve of Figures 7, 8, and 9.

The valve shown in Figures 1 and 2 comprises a casing 12 having an inlet port 13, a burner port 14 and a by-pass port 16. The valve may be provided with a port 17 for inserting a gauge for gauging the pressure in the pressure chamber 20 and when not in use, said gauge may be unscrewed and a plug inserted in said port. The valve is provided with a piston 18, which is shown with a reduced portion 19 and a needle valve 21 extending from the bottom of said reduced portion. The piston is provided at its upper end with a cup 22 for receiving one end of a spiral spring 23 while the upper end of said spring is provided with a spring guide 24 against which a screw 26 fits. This screw is mounted in a bonnet 27 which has an upwardly extending threaded collar 28 for receiving a cap 29 in order to cover the upper end of said screw and to prevent any of the liquid fuel from escaping therethrough. The bore of the valve casing is provided with a vertical channel 31 which said channel extends to a point above the bottom of the piston 18 when the needle valve 21 on said piston is seated in the seat 32 of the burner port 14.

The channel 31 in the bore of the casing is provided and gauged therein through the cooperation of a hardened steel plug 33 shown in Figure 10. The pad 34, having the valve seat 32, is faced to definitely fix the bottom of the piston 18 when the needle 21 is positioned in said seat. The bottom of the channel 31 must, therefore, be definitely fixed above the bottom of the piston in order that the by-passing of liquid fuel may commence and cut off at a definite pressure. Therefore, the plug 33 which is inserted into the bore of the casing 12 rests upon the pad 34 and has a channel 36 comprising an arcuate cut to a definite depth. The casing 12 is then drilled and as the drill and plug are both hardened, the drill will only cut to the bottom of the arcuate channel in the hard steel plug 36, thereby definitely locating the bottom of the channel at a fixed distance from the pad 34, and consequently from the bottom of the piston 18 when the same is in position with its needle valve in the seat 32. The bottom of the channel 36 is substantially V-shaped, as shown in Figure 2, thereby providing a graduated by-pass for the escape of excess liquid.

In the structure shown in Figure 3, the valve part has an extended guide 37 which is slidably mounted in the burner port 14; its tapered part 38 engaging the seat 32 in said port. The guide 37 just below the tapered part 38 is provided with a transverse hole 39, and a centrally located vertical hole 41 communicates with said transverse hole and extends through the lower end of said guide.

Figure 5 shows the piston 18 with a recess 42 extending down from the cup 22 therein, and a reduced hole 43 extending from said recess through the bottom of said piston. The piston is provided with a valve stem 44 having an enlarged head 46 while a small spiral spring 47 engaging the bottom of said recess by its one end and the enlarged head 46 by its other end so as to hold said enlarged head firmly against a plug 48 closing the upper end of said recess. The hole 43 is, of course, of greater diameter than the valve stem 44 in order to allow perfect seating of the needle 49 in the seat 32 on the pad 34. The piston 18 with the resilient valve stem 44 is assembled in a jig or fixture, and when the spring and valve stem have been placed, the plug 48 is pushed in from the cup side of the piston so that the position of the needle with respect to the bottom of the piston extension will always have a uniform length regardless of the length of the needle valve.

Figure 4 shows a valve stem having the enlarged head 46 identical with the head shown in Figure 5, but the valve stem has a tapered portion 51 conforming with the tapered portion 38 in Figure 3, and the lower end of said stem has a guide 52 with transverse hole 53 and centrally located vertical hole 54 identical with the guide and its holes, as shown in Figure 3.

Figures 7, 8, and 9 show a valve casing 56 having two ports 57 and 58 leading from the by-pass chamber in said valve. One of these ports may lead by piping back to the fuel supply source, and the other, if desired, may lead, by a short section of piping, direct to the suction side of the pressure pump, thereby forming a loop by which the strained liquid may be returned by the pump direct to the pressure chamber of the valve. If the loop connection is not desired, a plug may be inserted in one of the ports. While these ports have been shown in connection with the type of valve illustrated in Figure 8, it will be understood that two openings may lead from the by-pass end of the casing shown in Figures 1 and 2.

Referring now to Figure 8, the valve casing has the inlet port 13 and by-pass port 14, and the inner wall of the casing is provided with a shoulder 59 on which rests an annular flange 61 of a sleeve 62, and in the drawings this sleeve is shown as held in position by means of a nut 63 engaging the threads 64 in the upper end of said casing.

Of course, the sleeve and nut may be formed integral or the flange of the sleeve may drop into a slightly tapered facing on the inside of the casing wall in order that the same may be located concentric with the cylinder wall. The sleeve 62 in this type of valve is provided with the channel 31 drilled in the identical manner explained in connection with Figure 2, and the piston may be provided with an integral needle valve 21, as shown in Figure 2, or it may be provided with an integral needle valve having a guide, such as shown in Figure 3, or with either of the forms of resiliently mounted valve stems shown in Figures 4 and 5. The piston 18, spring 23, spring guide 24, regulating screw 27, bonnet 26 and cap 29 are identical with those shown in Figure 2.

It will be readily seen that with the types of valves shown in vertical section in Figures 2 and 8 along with the modifications shown in Figures 3, 4, and 5 that an efficient valve with reduced mechanism has been produced. Another feature of the type of valve illustrated and described herein is to eliminate point of contact which sets up noise and vibration in valves of the double-ended needle valve type. With that type, if the pump volume is only sufficient to crack the by-pass seat, the escaping oil generally has somewhat of a turbulent action and moves the needle one way or another to contact the seat, but with the construction illustrated and described herein, such contact is eliminated because in operation, when the oil or liquid is delivered onto the piston, the piston must lift the needle valve free from the burner port seat before any by-passing takes place as the valve is so constructed that at least sixty pounds, or preferably seventy-five pounds pressure must be developed under the piston before it is raised to a point where the by-passing starts to take place through the side channel or channels.

It is, of course, to be understood that one or more of the arcuate channels 31 may be provided in the valve casing of Figure 2, or in the sleeve 62 of Figure 8, and where there are to be a plurality of such grooves the hardened plug 33 shown in Figure 10 will be provided with additional arcuate channels having definite uniform depths.

Of course, the valve structures illustrated and described herein may be modified in various ways without departing from the invention herein set forth and hereafter claimed.

I claim:—

1. A liquid fuel pressure regulating valve comprising a casing, an inlet port, a burner port and a by-pass port, a sleeve removably mounted in said casing and providing an annular space with the casing, a spring depressed piston movable in said sleeve, a valve controlling said burner port and operable through the liquid pressure acting on said piston, and means for by-passing liquid fuel at a predetermined pressure.

2. A liquid fuel pressure regulating valve comprising a casing, an inlet port, a burner port and a by-pass port, a sleeve removably mounted in said casing and providing an annular pressure chamber, a spring depressed piston movable in said sleeve, a valve controlling said burner port and operable through the liquid pressure acting on said piston, and a channel in the bore of said sleeve whose lower end is above the normal low position of the piston for by-passing liquid fuel at a predetermined pressure.

3. A liquid fuel pressure regulating valve comprising a casing, an inlet port, a burner port and a by-pass port, a sleeve removably mounted in said casing and providing an annular space with the casing, a spring depressed piston having tension regulating means, a seat in the burner port, a valve on said piston having a tapered part normally resting in said seat, and a depending part extending into said port and acting as a guide for said valve, passageways in said depending part for the passage of fuel through said port when said valve is raised by a predetermined liquid pressure acting on said piston, and means for by-passing excess liquid fuel when a predetermined higher pressure is attained.

4. A liquid fuel pressure regulating valve comprising a casing, an inlet port, a burner port and a by-pass port, a sleeve removably mounted in said casing and providing an annular space with the casing, a spring depressed piston having tension regulating means, a seat in the burner port, a valve on said piston having a tapered part normally resting in said seat, and a depending part extending into said port and acting as a guide for said valve, passageways in said depending part for the passage of fuel through said port when said valve is raised by a predetermined liquid pressure acting on said piston, and a channel in said sleeve short of the bottom thereof for by-passing excess liquid fuel when the piston is further raised by a predetermined higher pressure.

5. A liquid fuel pressure regulating valve comprising a casing, an inlet port, a burner port and a by-pass port, an annular shoulder on the inside of said casing, a sleeve having an external collar adapted to rest on said shoulder and provide an annular space with the casing, means for retaining said sleeve in position, a piston adapted to operate in the bore of said sleeve, a spring engaging said piston and tending to hold the same downward, a valve controlling said burner port and operable through the liquid pressure acting on said piston against the tension of said spring, and means for by-passing liquid fuel at a predetermined pressure.

6. A liquid fuel pressure regulating valve comprising a casing, an inlet port, a burner port and a by-pass port, an annular shoulder on the inside of said casing, a sleeve having an external collar adapted to rest on said shoulder and provide an annular space with the casing, means for retaining said sleeve in position, a piston adapted to operate in the bore of said sleeve, a spring engaging said piston and tending to hold the same downward, a valve controlling said burner port and operable through the liquid pressure acting on said piston against the tension of said spring, and a channel in the bore of said sleeve whose lower end is above the normal low position of the piston for by-passing liquid fuel at a predetermined pressure.

7. A liquid fuel pressure regulating valve comprising a casing, an inlet port, a burner port and a by-pass port, a sleeve removably mounted in said casing and providing an annular space with the casing, a spring depressed piston, movable in said sleeve, means for regulating the tension of said spring, a needle valve formed on the bottom of said piston and integral therewith for controlling said burner port, and means for by-passing liquid fuel at a predetermined pressure.

8. A liquid fuel pressure regulating valve comprising a casing, an inlet port, a burner port and a by-pass port, a sleeve removably mounted in said casing and providing an annular space with the casing, a spring depressed piston movable in said sleeve, a laterally movable valve controlling said burner port and operable through the liquid pressure acting on said piston, and means for by-passing liquid fuel at a predetermined pressure.

9. A liquid fuel pressure regulating valve comprising a casing, an inlet port, a burner port and a by-pass port, a sleeve removably mounted in said casing and providing an annular space with the casing, a spring depressed piston movable in said sleeve, a laterally movable valve mounted in said piston for controlling said burner port and operable through the liquid pressure acting on said piston, and means for by-passing liquid fuel at a predetermined pressure.

10. A liquid fuel pressure regulating valve comprising a casing, an inlet port, a burner port and a by-pass port, a sleeve removably mounted in said casing and providing an annular space with the casing, a spring depressed piston movable in said sleeve, a valve controlling said burner port and operable through the liquid pressure acting on said piston, and a channel in the bore of said sleeve whose lower end is graduated and is above the normal low position of the piston for by-passing liquid fuel at a predetermined pressure.

11. A liquid fuel pressure regulating valve comprising a casing, an inlet port, a burner port and a by-pass port, a sleeve removably mounted in said casing and providing an annular space with the casing, a spring depressed piston movable in said sleeve, a valve controlling said burner port and operable through the liquid pressure acting on said piston, said valve being carried by said piston and having guide means to insure seating, and means for by-passing liquid fuel at a predetermined pressure.

12. A liquid pressure regulating valve comprising an inlet port and a by-pass port, a sleeve in said chamber spaced from the chamber wall and providing an annular space with the casing, a spring depressed piston movable in said sleeve, a valve controlling said burner port and operable through the liquid pressure acting on said piston, and a channel in the bore of said sleeve whose lower end is above the normal low position of the piston for by-passing liquid fuel at a predetermined pressure.

13. A liquid fuel pressure regulating valve comprising a casing, an inlet port, a burner port and a by-pass port, a sleeve removably mounted in said casing and providing an annular pressure chamber, a spring depressed piston movable in said sleeve, a valve controlling said burner port and operable through the liquid pressure acting on said piston, and a channel in the bore of said sleeve whose lower end is graduated and is above the normal low position of the piston for by-passing liquid fuel at a predetermined pressure.

THOMAS W. MURPHY.